(12) United States Patent
Sugimoto

(10) Patent No.: US 11,240,648 B2
(45) Date of Patent: Feb. 1, 2022

(54) DATAMESH NETWORK MANAGEMENT, ROUTING MANAGEMENT FOR MOVING NODES AND DATA DISTRIBUTION THROUGH VEHICLE MESH NETWORK

(71) Applicant: Toyota Motor North America, Inc., Plano, TX (US)

(72) Inventor: Shingo Sugimoto, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/904,389

(22) Filed: Jun. 17, 2020

(65) Prior Publication Data
US 2021/0400450 A1   Dec. 23, 2021

(51) Int. Cl.
*H04W 4/46* (2018.01)
*H04W 84/20* (2009.01)
*H04W 64/00* (2009.01)
*H04W 4/44* (2018.01)

(52) U.S. Cl.
CPC ............. *H04W 4/46* (2018.02); *H04W 4/44* (2018.02); *H04W 64/006* (2013.01); *H04W 84/20* (2013.01)

(58) Field of Classification Search
CPC ... H04W 24/00; H04W 64/00; H04W 64/003; H04W 64/006; H04W 84/18; H04W 4/46; H04W 4/44; H04W 84/20
See application file for complete search history.

(56) References Cited

U.S. PATENT DOCUMENTS

| | | | |
|---|---|---|---|
| 6,862,500 B2 | 3/2005 | Tzamaloukas | |
| 7,848,278 B2 | 12/2010 | Chen et al. | |
| 8,081,995 B2 | 12/2011 | Kim | |
| 9,439,121 B2 | 9/2016 | Sargento et al. | |
| 9,478,129 B1 | 10/2016 | Kothari et al. | |
| 9,826,368 B2 | 11/2017 | Milne et al. | |
| 10,243,604 B2 | 3/2019 | Ross et al. | |
| 2008/0311930 A1* | 12/2008 | Kalhan | H04W 84/18 |
| | | | 455/456.5 |

(Continued)

FOREIGN PATENT DOCUMENTS

| | | |
|---|---|---|
| CN | 105355089 A | 2/2016 |
| CN | 109874126 A | 6/2019 |

OTHER PUBLICATIONS 3 ways autonomous vehicles will depend on mesh networks URL: https://veniam.com/3-ways-autonomous-vehicles-will-depend-on-mesh-networks/; Published Date Apr. 16, 2018.

(Continued)

*Primary Examiner* — Philip Sobutka
(74) *Attorney, Agent, or Firm* — Dinsmore & Shohl LLP

(57) ABSTRACT

Vehicles, systems and methods for establishing a mesh network among a plurality of vehicles are described herein. An electronic control unit configured to determine a current position and a future position of a vehicle, determine a current position and a future position of another vehicle, generate a mesh network including the vehicle and the another vehicle based on: (i) a comparison of the current position of the vehicle and the current position of the another vehicle; and (ii) a comparison of the future position of the vehicle and the future position of the another vehicle.

18 Claims, 4 Drawing Sheets

(56) References Cited

U.S. PATENT DOCUMENTS

2014/0185499 A1\* 7/2014 Ray .................... H04L 12/18
                                                        370/310

OTHER PUBLICATIONS

WiFi mesh for future vehicles URL: http://www.strixsystems.com/cswifimeshforfuturevehicles.aspx; Published Date: Feb. 25, 2020.

Nasr, M. M., Abdelgader, A. M., Wang, Z. G., & Shen, L. F. (2016). VANET Clustering Based Routing Protocol Suitable for Deserts. Sensors (Basel, Switzerland), 16(4), 478. https://doi.org/10.3390/s16040478.

\* cited by examiner

DATAMESH NETWORK MANAGEMENT, ROUTING MANAGEMENT FOR MOVING NODES AND DATA DISTRIBUTION THROUGH VEHICLE MESH NETWORK

TECHNICAL FIELD

The present specification generally relates to mesh networks between vehicles and, more specifically, the present disclosure provides systems and methods for establishing mesh networks among vehicles.

BACKGROUND

Communication functionality between vehicles, the internet, and other data sources is an ever-increasing requirement for vehicles. Communication functionality enables a vehicle to share information, such as sensor information, receive and transmit system updates, navigation information, and the like. For example, when a vehicle requires an update, a vehicle connects to the internet and receives the update from an internet based data source, such as a server. Additionally, vehicles may be configured to establish peer-to-peer networks, generally referred to as vehicle-to-vehicle communication (V2V). These networks may be established based on proximity of vehicles to each other and/or strength of signal. However, the network connections may be transient as vehicles change speed, direction of travel or the like. Without the ability to establish less transient network connections, the effectiveness of operations, such as edge computing between vehicles or sharing updates, which can consist of large files, may not be fully utilized since the connections may periodically change.

Accordingly, there is need for determining and establishing mesh networks that reduce transient connections.

SUMMARY

In one embodiment, an electronic control unit is configured to determine a current position and a future position of a vehicle, determine a current position and a future position of another vehicle, and generate a mesh network including the vehicle and the another vehicle based on: (i) a comparison of the current position of the vehicle and the current position of the another vehicle; and (ii) a comparison of the future position of the vehicle and the future position of the another vehicle.

In some embodiments, a computing device is configured to receive current position information and future position information from a plurality of vehicles, compare the current position information and the future position information among the plurality of vehicles, identify a set of vehicles of the plurality of vehicles for inclusion in a mesh network based on comparing the current position information and the future position information among the plurality of vehicles, and establish the mesh network including the identified set of vehicles.

In some embodiments, a method for establishing a mesh network among a plurality of vehicles includes receiving, at a computing device, current position information and future position information from a plurality of vehicles, comparing the current position information and the future position information among the plurality of vehicles, identifying a set of vehicles of the plurality of vehicles for inclusion in the mesh network based on the comparison of the current position information and the future position information among the plurality of vehicles, and establishing the mesh network including the identified set of vehicles.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for establishing mesh networks among vehicles. The mesh networks may facilitate information sharing, edge computing, access to wide area networks, and the like among the vehicles of the mesh network. Embodiments described herein are directed to establishing mesh networks that limit the number of transient members to the mesh network, thereby improving the effectiveness of communication and operations such as edge computing among the vehicles of the mesh network. As described herein, the mesh networks are established based on parameters beyond the typical proximity relationships of the telematics units of the vehicles. For example, the systems and methods for establishing mesh networks described herein include determining traveling parameters of a group of vehicles and identifying a set of vehicles that share similar or the same traveling parameters.

In some embodiments, a mesh network among vehicles may be generated using a routing table grouping. That is, the routing table may be established based on a destination, a current position, and/or a predicted future position of a set of vehicles. A controller may determine a plurality of target vehicles to be grouped based on these parameters and establish a mesh network among those having parameters within predefined thresholds. For example, each vehicle may include a telematics unit (e.g., a 4G LTE or similar system) to upload/download data. When grouped together, information may be downloaded from a server to a vehicle and then distributed to each vehicle within the group based on the routing table grouping.

In some embodiments, a mesh network among vehicles may be generated using routing tables based on geographic difference vectors, and optionally, in addition to radio metric, such as signal strength and the like. Current systems rely on only radio metric, but radio metric can be changed by position (distance) of each node (i.e., a telematics unit of a vehicle) from another. So, if a node is in the process of traveling out of range (i.e., distance increasing from based node), then there is no need to include that node into the mesh. Geographic difference vectors may include information such as vehicle velocity, direction, distance from the base node, or the like. Based on the geographic difference vectors and radio metric a controller may determine which vehicles to include in the mesh network.

Another embodiment may include a mesh network among vehicles generated based on which vehicle has valuable data to be shared. For example, a master node vehicle may be established if they have received information valuable to other vehicles, such as a vehicle system update or the like. Systems and methods for establishing mesh networks among vehicles will now be described herein.

Figure 1:
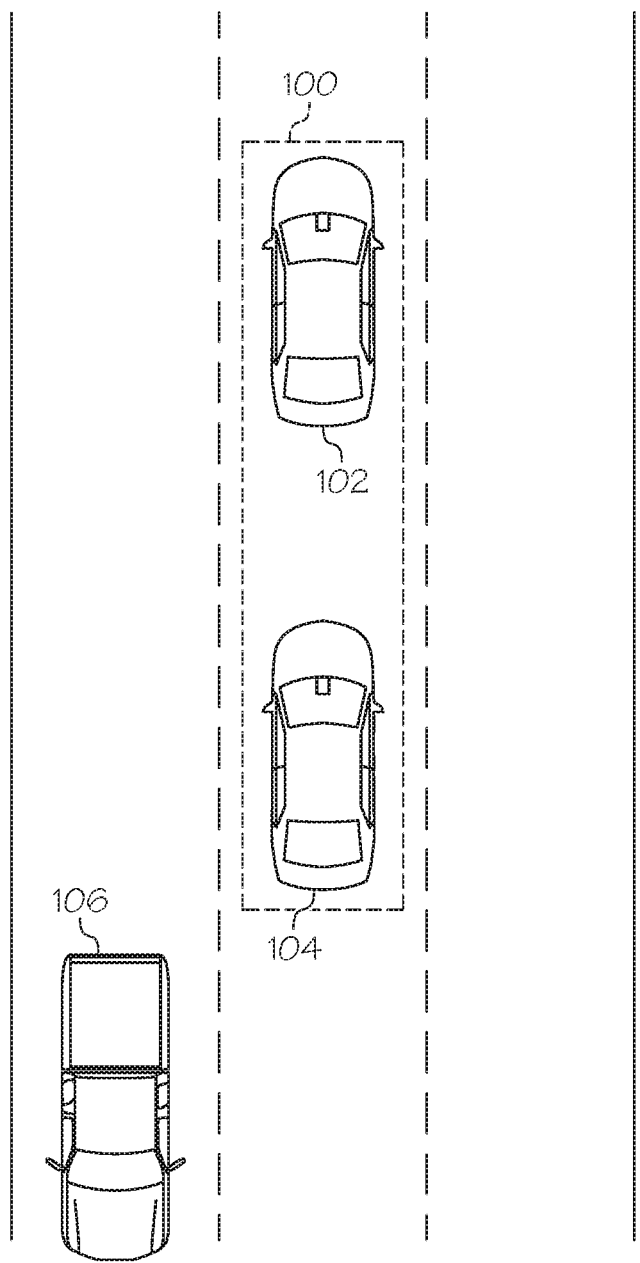
FIG. 1 depicts an illustrative embodiment of vehicles and a mesh network including a set of the vehicles according to one or more embodiments shown and described herein.

Turning now to the drawings wherein like numbers refer to like structures, and particularly to FIG. 1, an illustrative embodiment of a mesh network 100 including two vehicles traveling with the same heading and velocity is depicted. As shown, a mesh network 100 includes a first vehicle 102 and a second vehicle 104. A third vehicle 106 which is not part of the mesh network is also traveling along the road but with a heading that is different from that of the first vehicle 102 and the second vehicle 104. Accordingly, the third vehicle 106 is not added to the mesh network because its membership in the network would be very transient. In embodiments, which will be described in more detail here, two or more vehicles that are determined to be traveling with similar speeds, headings, proximities, destinations, or the like may be identified and grouped together via their telematics units in a mesh network 100.

In FIG. 1, the mesh network 100 includes a first vehicle 102 and a second vehicle 104, where the second vehicle 104 is traveling behind the first vehicle 102. While traveling in a line formation, for example, one vehicle behind the other is one example of a traveling configuration, it is understood that the vehicles of a mesh network 100 may not travel in a line formation or even within line of sight of each other. In some embodiments, the vehicles of a mesh network 100 may be separated by other vehicles on the road or may be a predefined distance apart, but still traveling with similar speeds, headings, proximities, destinations, and/or the like.

For example, the first vehicle 102 may be traveling at a heading of 10 degrees and a speed of 60 miles per hour. The second vehicle 104 may be traveling at a heading of 10 degrees and a speed of 61 miles per hours. The third vehicle 106 may be traveling at a heading of 190 degrees and a speed of 59 miles per hour. A computing device or an electronic control unit of, for example, a first vehicle 102, each described in more detail herein, may receive speed and heading information from each of the vehicles 102, 104, 106 and identify a set of vehicles that share similar or the same speed and heading parameters. The identified vehicles may then be linked to form a mesh network 100. The mesh network 100 may be formed by establishing a routing table that includes at least the telematics units' identification number and optionally connection information such as an IP address or the like.

The computing device and/or electronic control unit may store the routing table in its memory (e.g., non-transitory computer-readable memory). Furthermore, the computing device and/or electronic control unit may further determine member vehicles to be included in a mesh network 100 based on their distance from each other and/or an ultimate destination. These parameters may be dependent on speed and heading information or independent therefrom.

The vehicles grouped together and in communication with each other via a mesh network operate in an edge-computing environment where tasks such as navigation, autonomous environment detection and analysis, and the like may be performed by the electronic control units of vehicles that have available resources. For example, one vehicle may have an electronic control unit with advanced computing power over another vehicle, so that vehicle may be tasked with operations that require advanced computing resources. Other vehicles may include sensor packages that are superior or positioned better with respect to their traveling relationships. Therefore, those sensor packages may be utilized over those of other vehicles in the mesh network. In some embodiments, a vehicle may have data or system updates that other vehicles in the mesh network require. Therefore, instead of the other vehicles establishing a cellular connection, which may be slow and costly, the vehicles in the mesh network, through a local connection interface such as WiFi, may transmit and receive data such as an update for a vehicle system. This may reduce download times and improve the distribution of a system update as vehicles may operate as additional sources of the update as opposed to a central server connected to via a wide area network.

In embodiments described herein, a vehicle of a mesh network may be identified as a master node vehicle. This vehicle may receive the designation of master node vehicle based on capabilities of the vehicle, such as processing or computing resources, advanced telematics systems, or the like. This vehicle may also receive this designation based on information that it may have that other vehicles require. A master node vehicle may operate as an access point for other vehicles to connect through to access a wide area network (WAN), such as the internet. For example, some vehicles may only be equipped with near field communication interfaces such as Bluetooth or WiFi. These vehicles may be able to access WAN destinations by transmitting through a master node vehicle that is equipped with a telematics unit having 4G LTE, 5G, or other long-range interface system.

Figure 2:
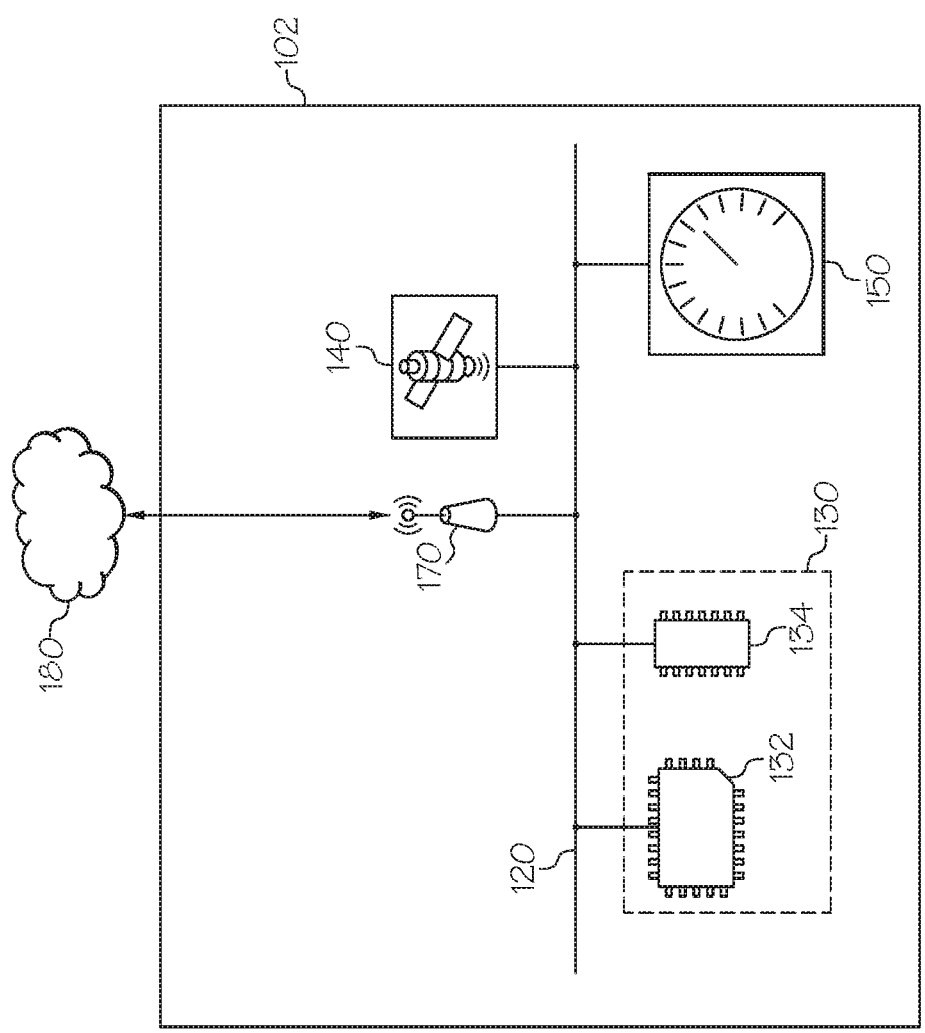
FIG. 2 schematically depicts components of a vehicle according to one or more embodiments shown and described herein.

Referring now to FIG. 2, an example schematic of a vehicle including sensor resources and a computing device is depicted. Not every vehicle is equipped with the same sets of sensor resources, nor may be configured with the same set of telematics resources. FIG. 2 only provides one example configuration of sensor resources and systems equipped within a vehicle. Furthermore, although FIG. 2 references vehicle 102, any vehicle, for example vehicles 104 and 106, discussed and described herein may include the same or a similar configuration as vehicle 102 described with respect to FIG. 2.

For example, a vehicle 102 may include an electronic control unit 130 comprising a processor 132 and a non-transitory computer readable memory 134, a navigation unit 140 such as a global positioning system (GPS) and/or electronic compass, a vehicle speed sensor 150, and a telematics unit 170. These and other components of the vehicle may be communicatively connected to each other via a communication path 120.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverse. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 102 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 2 includes a single processor 132, other embodiments may include more than one processor 132.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 134, other embodiments may include more than one memory module.

Still referring to FIG. 2, a navigation unit 140 such as a global positioning system, GPS, and/or electronic compass may be coupled to the communication path 120 and communicatively coupled to the electronic control unit 130 of the vehicle 102. The navigation unit 140 is capable of generating location information and/or heading information indicative of a location of the vehicle 102 by receiving one or more GPS signals from one or more GPS satellites. The navigation unit 140 may be configured to generate heading information, for example, based on an electronic compass. The GPS signal communicated to the electronic control unit 130 via the communication path 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The vehicle 102 may also include a vehicle speed sensor 150 coupled to the communication path 120 and communicatively coupled to the electronic control unit 130. The vehicle speed sensor 150 may be any sensor or system of sensors for generating a signal indicative of vehicle speed. For example, without limitation, a vehicle speed sensor 150 may be a tachometer that is capable of generating a signal indicative of a rotation speed of a shaft of the vehicle 102 engine or a drive shaft. Signals generated by the vehicle speed sensor 150 may be communicated to the electronic control unit 130 and converted to a vehicle speed value. The vehicle speed value is indicative of the speed of the vehicle 102. In some embodiments, the vehicle speed sensor 150 comprises an opto-isolator slotted disk sensor, a Hall Effect sensor, a Doppler radar, or the like. In some embodiments, a vehicle speed sensor 150 may comprise data from a GPS for determining the speed of a vehicle 102. The vehicle speed sensor 150 may be provided so that the electronic control unit 130 may determine when the vehicle 102 accelerates, maintains a constant speed, slows down or is comes to a stop. For example, a vehicle speed sensor 150 may provide signals to the electronic control unit 130 indicative of a vehicle 102 slowing down due to a change in traffic conditions or prior to the vehicle performing a turning maneuver.

Still referring to FIG. 2, vehicles are now more commonly equipped with vehicle-to-vehicle communication systems or in other words a telematics unit 170. The telematics unit 170 may be coupled to the communication path 120 and communicatively coupled to the electronic control unit 130. The telematics unit 170 may be any device capable of transmitting and/or receiving data with a network 180 or directly with another vehicle (e.g., vehicle 104 or 106) equipped with a telematics unit 170. Accordingly, telematics unit 170 can include a communication transceiver for sending and/or receiving any wired or wireless communication. For example, the telematics unit 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, a telematics unit 170 may include hardware configured to operate in accordance with the Bluetooth wireless communication protocol. In another embodiment, a telematics unit 170 may include a Bluetooth send/receive module for sending and receiving Bluetooth communications to/from a network 180 and/or another vehicle.

Figure 3:
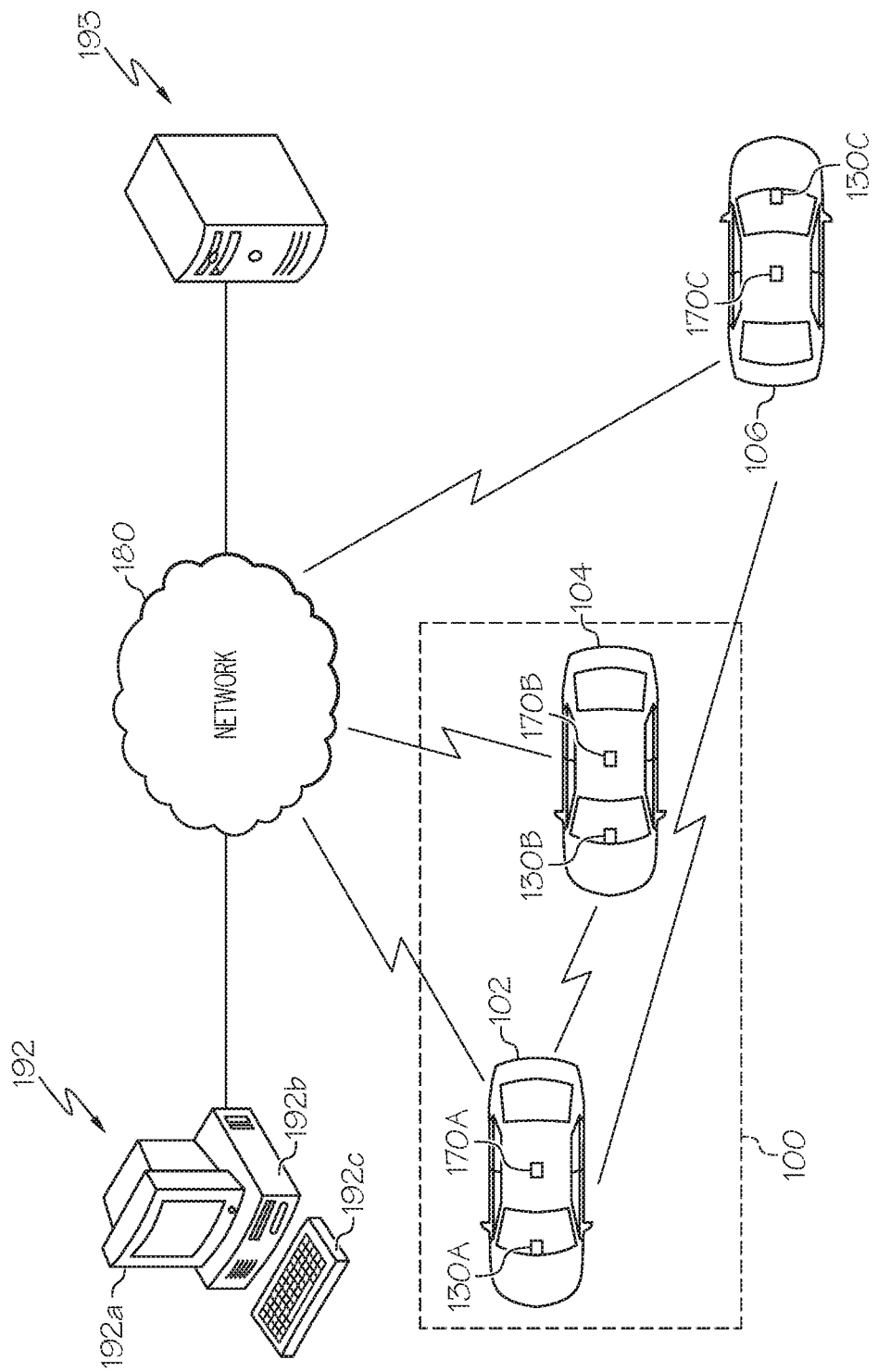
FIG. 3 depicts an illustrative embodiment of a system for establishing a mesh network among vehicles according to one or more embodiments shown and described herein.

Referring now to FIG. 3, an illustrative embodiment of a system for communicating with a plurality of vehicles 102, 104, 106 and a mesh network 100 defined therein is depicted. In some embodiments, communication between vehicles 102, 104 and 106 may be direct. That is, a first vehicle 102 may communicate directly with a second vehicle 104 and/or a third vehicle 106, the second vehicle 104 may communicate directly with the first vehicle 102 and/or the third vehicle 106, and the third vehicle 106 may communicate directly with the first vehicle 102 and/or the second vehicle 104. In some embodiments, the vehicles 102, 104 and 106 may communicate with each other through a network 180. In yet some embodiments, the vehicles 102, 104 and 106 may communicate with one or more computing devices 192 and/or servers 193.

The network 180 may include one or more computer networks (e.g., a personal area network, a local area network, or a wide area network), cellular networks, satellite networks and/or a global positioning system and combinations thereof. Accordingly, the vehicles 102, 104 and 106 and the computing device 192 and/or server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In particular, FIG. 3 depicts a first vehicle 102 having an electronic control unit 130A and a telematics unit 170A, a second vehicle 104 having an electronic control unit 130B and a telematics unit 170B, and a third vehicle having an electronic control unit 130C and a telematics unit 170C. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include may include a processor, input/output hardware, network interface hardware, a data storage, and a memory component. The server 193 may have a similar configuration as the computing device 192, but configured to operate more strictly as a data storage and application support device.

The processor may include any processing component(s) configured to receive and execute instructions (such as from the data storage component and/or memory component). The instructions may be in the form of a machine-readable instruction set stored in the data storage component and/or the memory component. The input/output hardware may include a monitor, keyboard, mouse, printer, camera, microphone, speaker, and/or other device for receiving, sending, and/or presenting data. The network interface hardware may include any wired or wireless networking hardware, such as a modem, LAN port, Wi-Fi card, WiMax card, mobile communications hardware, and/or other hardware for communicating with other networks and/or devices.

It should be understood that the data storage component may reside local to and/or remote from the computing device 192 and may be configured to store one or more pieces of data such as a routing table, updates for vehicle systems, or the like for access by the computing device 192 and/or other components. It is understood that the server 193 may also be configured to store one or more pieces of data such as a routing table, updates for vehicle systems, or the like for access by the computing device 192 and/or vehicles via the network 180.

A computing device 192 and/or an electronic control unit 130 may then use the speed, heading, position, and/or destination information, also referred to herein as traveling parameters, to determine relationships between the vehicles and identify vehicles that may form a mesh network based on their traveling parameters. Once a mesh network is established by the computing device 192 or the electronic control unit 130, a master node vehicle (e.g., vehicle 102) may be identified and utilized as an access point for other vehicles (e.g., vehicle 104) in the mesh network 100 to communicate with the computing device 192, the server 193, or other devices via the WAN (e.g., the network 180).

Figure 4:
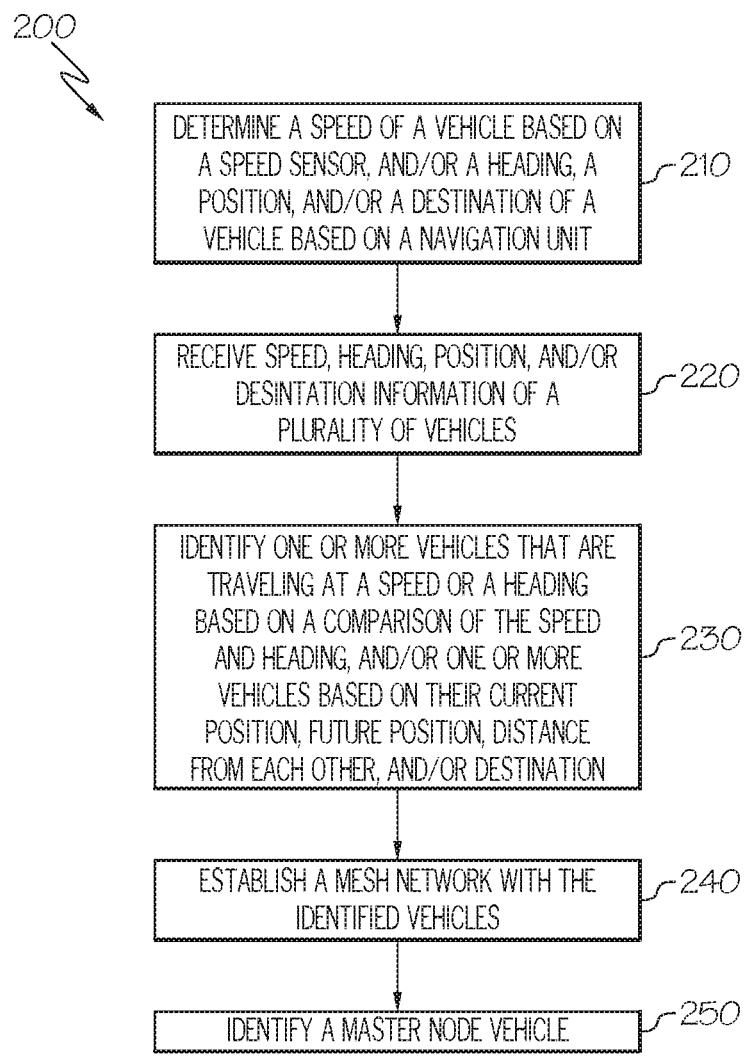
FIG. 4 depicts a flowchart of an example method for establishing a mesh network among a plurality of vehicles according to one or more embodiments shown and described herein.

Referring now to FIG. 4, a flowchart 200 of an example method for establishing a mesh network among a plurality of vehicles is depicted. As described above, the method may be carried out by a computing device 192 and/or an electronic control unit 130 of a vehicle 102 (e.g., 102, FIGS. 1-3). The flowchart 200 depicted in FIG. 4 is a representation of a machine-readable instruction set stored in the non-transitory computer readable memory 134 and executed by the processor 132 of an electronic control unit 130 or a processing unit 192b of a computing device 192. The process of the flowchart 200 in FIG. 4 may be executed at various times and intermittently repeated (e.g., every minute, five minutes, etc.) to confirm membership of vehicles to a mesh network.

At block 210, an electronic control unit 130 of a vehicle 102, 104, 106 determines a speed of a vehicle 102, 104, 106 based on based on one or more signals from a vehicle speed sensor 150 and a heading of the vehicle 102, 104, 106 based on data from a navigation unit 140. In some embodiments, speed information and/or heading information may be determined from GPS signal data. In some embodiments, the electronic control unit 130 may determine a position of a vehicle 102, 104, 106 based on data from the navigation unit 140. The position information received by the computing device 192 and/or electronic control unit 130 may include a current position of the vehicle 102 and a future destination of the vehicle 102. The position information received by the computing device 192 and/or electronic control unit 130 may also include a current position of another vehicle 104 or 106 and a future destination of the another vehicle 104 or 106. The position information may be obtained using a navigation unit 140. In further embodiments, the electronic control unit 130 may determine a destination of the vehicle 102, 104, 106 based on data from the navigation unit 140. The vehicles 102, 104, 106 may then transmit the data to one or more other vehicles 102, 104, 106 and/or a computing device 192 via a network 180 using their telematics units 170.

The computing device 192 and/or the electronic control unit 130 receives the speed, heading, position, and/or destination information from a plurality of vehicles 102, 104, 106 at block 220. At block 230, the computing device 192 and/or the electronic control unit 130 processes the received information. In some embodiments, the computing device 192 and/or the electronic control unit 103 identifies and/or generates a mesh network including one or more vehicles based on: (i) a comparison of the current positions of the vehicles and (ii) a comparison of the future positions of the vehicles. As one example and without limitation, the computing device 192 and/or the electronic control unit 130 identify one or more vehicles of the plurality of vehicles that have similar current positions and similar future positions. For example, similar current positions and similar future positions may be vehicles within a predetermined range of each other and/or have a similar heading and speed, or the like.

In some embodiments, the computing device 192 and/or the electronic control unit 103 identifies and/or generates a mesh network including one or more vehicles based on: (i) a comparison of the speed of the vehicles and (ii) a comparison of the heading of the vehicles. As one example and without limitation, the computing device 192 and/or the electronic control unit 130 identify one or more vehicles of the plurality of vehicles that are traveling at a speed that is less than or equal to a predetermined speed threshold of each other and have a heading that is less than or equal to a predetermined heading threshold of each other. The predetermined speed threshold may be about +/−10 miles per hour, about +/−9 miles per hour, about +/−8 miles per hour, about +/−7 miles per hour, about +/−6 miles per hour, about +/−5 miles per hour, about +/−4 miles per hour, about +/−3 miles per hour, about +/−2 miles per hour, about +/−1 miles per hour, or about +/−0.5 miles per hour. The predetermined heading threshold may be +/−10 degrees, +/−9 degrees, +/−8 degrees, +/−7 degrees, +/−6 degrees, +/−5 degrees, +/−4 degrees, +/−3 degrees, +/−2 degrees, +/−1 degrees, +/−0.5 degrees, or +/−0.25 degrees.

In some embodiments, at block 230, the computing device 192 and/or the electronic control unit 130 determine a distance between two or more vehicles of the plurality of vehicles. The computing device 192 and/or the electronic control unit 130 may identify a set of vehicles that are less than or equal to a predetermined distance from each other. The predetermined distance may be 1 mile, ¾ mile, ½ mile, ¼ mile, 5000 ft, 4000 ft, 3000 ft, 2000 ft, 1500 ft, 1000 ft, 500 ft, or 250 ft. The distance between two or more vehicles may be determined based on the position of each vehicle, for example, from location information derived from GPS data. The distance between the two or more vehicles may be a parameter considered in addition to a speed and heading of a vehicle when forming a mesh network or independently therefrom. When the computing device 192 or the electronic control unit 130 determines that the distance between a vehicle and another vehicle is greater than a predetermined distance, the computing device 192 or the electronic control unit 130 removes or excludes the vehicle and/or the another vehicle from the mesh network. That is, whichever vehicle is moved away from the mesh network may be excluded or removed. Conversely, when the computing device 192 or the electronic control unit 130 determines that the distance between a vehicle and another vehicle is equal to or less than a predetermined distance, the computing device 192 or the electronic control unit 130 adds the vehicle and/or the another vehicle from the mesh network.

In yet some embodiments, at block 230, the computing device 192 and/or the electronic control unit 130 determine destinations of the plurality of vehicles and identify vehicles having the same or similarly located destinations. For example, similarly located destinations may be destinations within the same town, shopping plaza, neighborhood, or the like. The parameter of destination may be a parameter considered in addition to a speed and heading of a vehicle and/or distance between the vehicles when forming a mesh network or independently therefrom. In some embodiments, radio signal strength may be used as a metric for determining whether a vehicle should be included in a mesh network.

At block 240, the computing device 192 and/or the electronic control unit 130 establish a mesh network with the identified vehicles based on the travel parameters (e.g., speed, heading, position, and/or destination) implemented by the systems and methods described herein. The mesh network may be defined in a memory component of the computing device 192 and/or the electronic control unit 130 by an identification number or name of the vehicles belonging to the mesh network and/or an address such as an IP address. This information may be stored as a routing table. The routing table may also include the traveling parameters of the vehicles when they were added to the mesh network. As such, from time to time the computing device 192 and/or the electronic control unit 130 may compare new travel parameters to those stored in the memory component to determine whether the vehicle should remain a member of the mesh network based on any changes to the travel parameters.

At block 250, the computing device 192 and/or the electronic control unit 130 may further identify a master node vehicle. The mater node vehicle may operate as an access point to a wide area network for the other vehicles of the mesh network. The master node vehicle may be identified as the master node vehicle based on a determination by the computing device 192 and/or the electronic control unit 130 that the master node vehicle includes a system update for sharing with one or more of the vehicles forming the mesh network. In some embodiments, the master node vehicle is identified as the master node vehicle based on a determination by the computing device 192 and/or the electronic control unit 130 that the master node vehicle includes a telematics unit or an electronic control unit that is more advanced than one or more of the other vehicles of the mesh network 100.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments described herein are directed to establishing mesh networks among vehicles. For example, a vehicle may include a speed sensor configured to generate one or more signals indicative of a speed of the vehicle, a navigation unit for determining at least one of a position of the vehicle, a heading of the vehicle or a destination of the vehicle, a telematics unit configured to transmit and receive information from the vehicle; and an electronic control unit communicatively coupled to the speed sensor, the navigation unit, and the telematics unit. The electronic control unit is configured to determine a speed of the vehicle based on the one or more signals from the speed sensor, determine a heading of the vehicle based on data from the navigation unit, receive, via the telematics unit, the speed and heading information from one or more other vehicles, identify one or more vehicles of the one or more other vehicles that are traveling at a speed within a predetermined speed threshold of the speed of the vehicle and a heading within a predetermined heading threshold of the heading of the vehicle, and generate a mesh network with the one or more identified other vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electronic control unit configured to:
   determine a current position and a future position of a vehicle;
   determine a current position and a future position of another vehicle;
   generate a mesh network including the vehicle and the another vehicle based on: (i) a comparison of the current position of the vehicle and the current position of the another vehicle; and (ii) a comparison of the future position of the vehicle and the future position of the another vehicle; and
   identify one of the vehicle or the another vehicle as a master node vehicle of the mesh network based on a determination by the electronic control unit that the master node vehicle includes a telematics unit or an electronic control unit that is more advanced than that of one or more other vehicles of the mesh network.

2. The electronic control unit of claim 1, wherein the electronic control unit is further configured to:
   transmit a vehicle system update to one of the vehicles of the mesh network.

3. The electronic control unit of claim 1, wherein the electronic control unit is a component of the vehicle of the mesh network and the vehicle comprises a telematics unit, the telematics unit of the vehicle is configured to operate as an access point to a wide area network for the another vehicle of the mesh network.

4. The electronic control unit of claim 1, wherein the electronic control unit is further configured to add an identification of the vehicle and the another vehicle to a mesh network routing table.

5. The electronic control unit of claim 1, wherein the electronic control unit is further configured to:
   determine a distance between the vehicle and the another vehicle,
   update the mesh network to include the vehicle and the another vehicle when the distance is less than or equal to a predetermined distance from the vehicle, and
   update the mesh network to remove or exclude the another vehicle when the distance is greater than the predetermined distance from the vehicle.

6. The electronic control unit of claim 5, wherein the predetermined distance is 1500 feet.

7. The electronic control unit of claim 1, wherein the electronic control unit is further configured to:
   determine a destination of the vehicle,
   determine a destination of the another vehicle,
   compare the destination of the vehicle and the destination of the another vehicle, and
   update the mesh network to include the vehicle and the another vehicle when the destination of the vehicle and the destination of the another vehicle are the same.

8. The electronic control unit of claim 1, wherein the electronic control unit is further configured to:
   determine a speed and heading of the vehicle,
   determine a speed and heading of the another vehicle,
   update the mesh network to include the vehicle and the another vehicle based on (i) a comparison of the speed of the vehicle and the speed of the another vehicle; and (ii) a comparison of the heading of the vehicle and the heading of the another vehicle.

9. The electronic control unit of claim 8, wherein:
   the comparison of the speed of the vehicle and the speed of the another vehicle includes determining the speed of the vehicle and the speed of the another vehicle is less than or equal to a predetermined speed threshold, and
   the comparison of the heading of the vehicle and the heading of the another vehicle includes determining the heading of the vehicle and the heading of the another vehicle is less than or equal to a predetermined heading threshold.

10. A computing device configured to:
    receive current position information and future position information from a plurality of vehicles;
    compare the current position information and the future position information among the plurality of vehicles;
    identify a set of vehicles of the plurality of vehicles for inclusion in a mesh network based on comparing the current position information and the future position information among the plurality of vehicles;
    establish the mesh network including the identified set of vehicles; and
    identify one of the vehicle or the another vehicle as a master node vehicle of the mesh network based on a determination by the computing device that the master node vehicle includes a telematics unit or an electronic control unit that is more advanced than that of one or more other vehicles of the mesh network.

11. The computing device of claim 10, wherein the master node vehicle operates as an access point to a wide area network for the set of vehicles of the mesh network.

12. The computing device of claim 10, wherein the master node vehicle is identified as the master node vehicle based on a determination by the computing device that the master node vehicle includes a system update for sharing with one or more of the vehicles forming the mesh network.

13. The computing device of claim 10, wherein the computing device is further configured to:
    receive position information from the plurality of vehicles,
    determine a distance between the plurality of vehicles,
    identify a set of vehicles of the plurality of vehicles that are within a predetermined distance from each other, and
    update the mesh network to include the set of identified vehicles that are within the predetermined distance.

14. The computing device of claim 10, wherein the computing device is further configured to:
receive destination information from the plurality of vehicles,
identify a set of vehicles of the plurality of vehicles that have the same destination, and
update the mesh network to include the set of identified vehicles having the same destination.

15. A method for establishing a mesh network among a plurality of vehicles, the method comprising:
receiving, at a computing device, current position information and future position information from a plurality of vehicles;
comparing the current position information and the future position information among the plurality of vehicles;
identifying a set of vehicles of the plurality of vehicles for inclusion in the mesh network based on the comparison of the current position information and the future position information among the plurality of vehicles;
establishing the mesh network including the identified set of vehicles; and
identifying one of the vehicle or the another vehicle as a master node vehicle of the mesh network based on a determination by the computing device that the master node vehicle includes a telematics unit or an electronic control unit that is more advanced than that of one or more other vehicles of the mesh network.

16. The method of claim 15, further comprising:
determining a distance between the plurality of vehicles based on the current position information and the future position information;
identifying a set of vehicles of the plurality of vehicles that are within a predetermined distance from each other; and
updating the mesh network to include the set of identified vehicles that are within the predetermined distance.

17. The method of claim 15, further comprising:
receiving destination information from the plurality of vehicles;
identifying a set of vehicles of the plurality of vehicles that have the same destination; and
updating the mesh network to include the set of identified vehicles having the same destination.

18. The method of claim 15,
wherein the master node vehicle operates as an access point to a wide area network for the vehicles of the mesh network.

* * * * *